Dec. 8, 1964    K. W. STALKER    3,160,258
LOADING MACHINE
Filed March 28, 1962    3 Sheets-Sheet 1
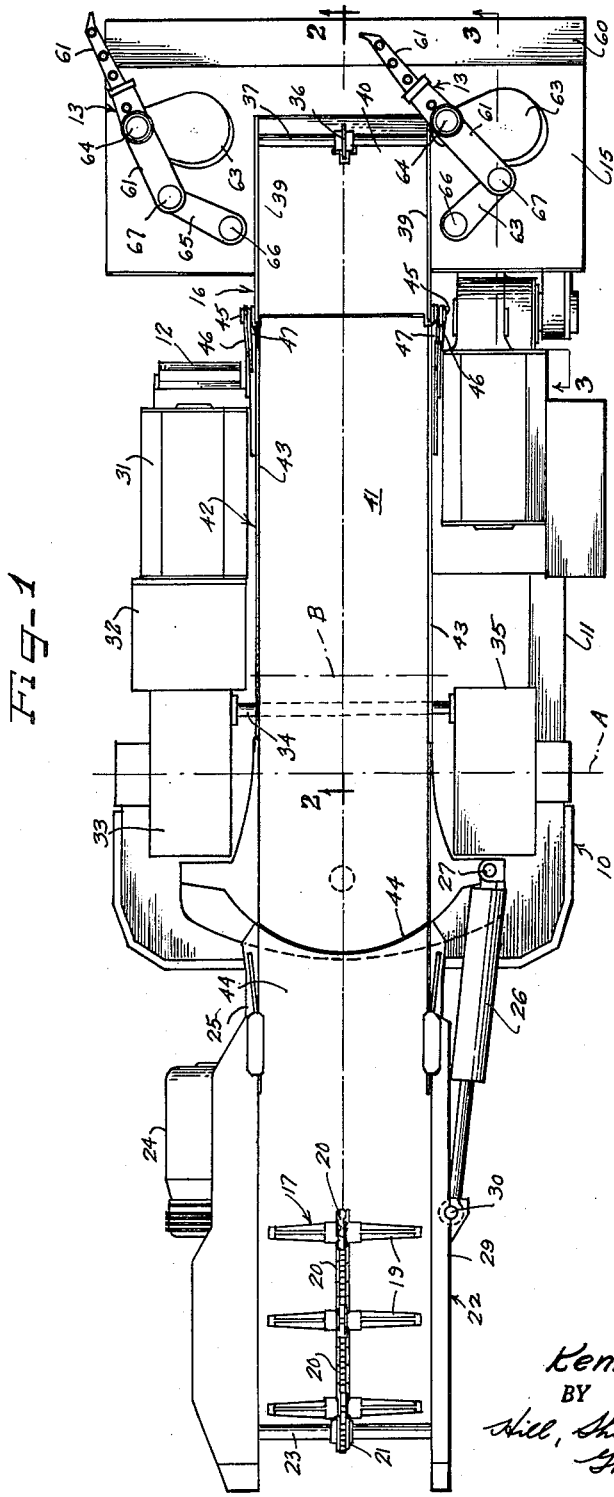
INVENTOR.
Kenneth W. Stalker
BY
Hill, Sherman, Meroni
Gross & Simpson

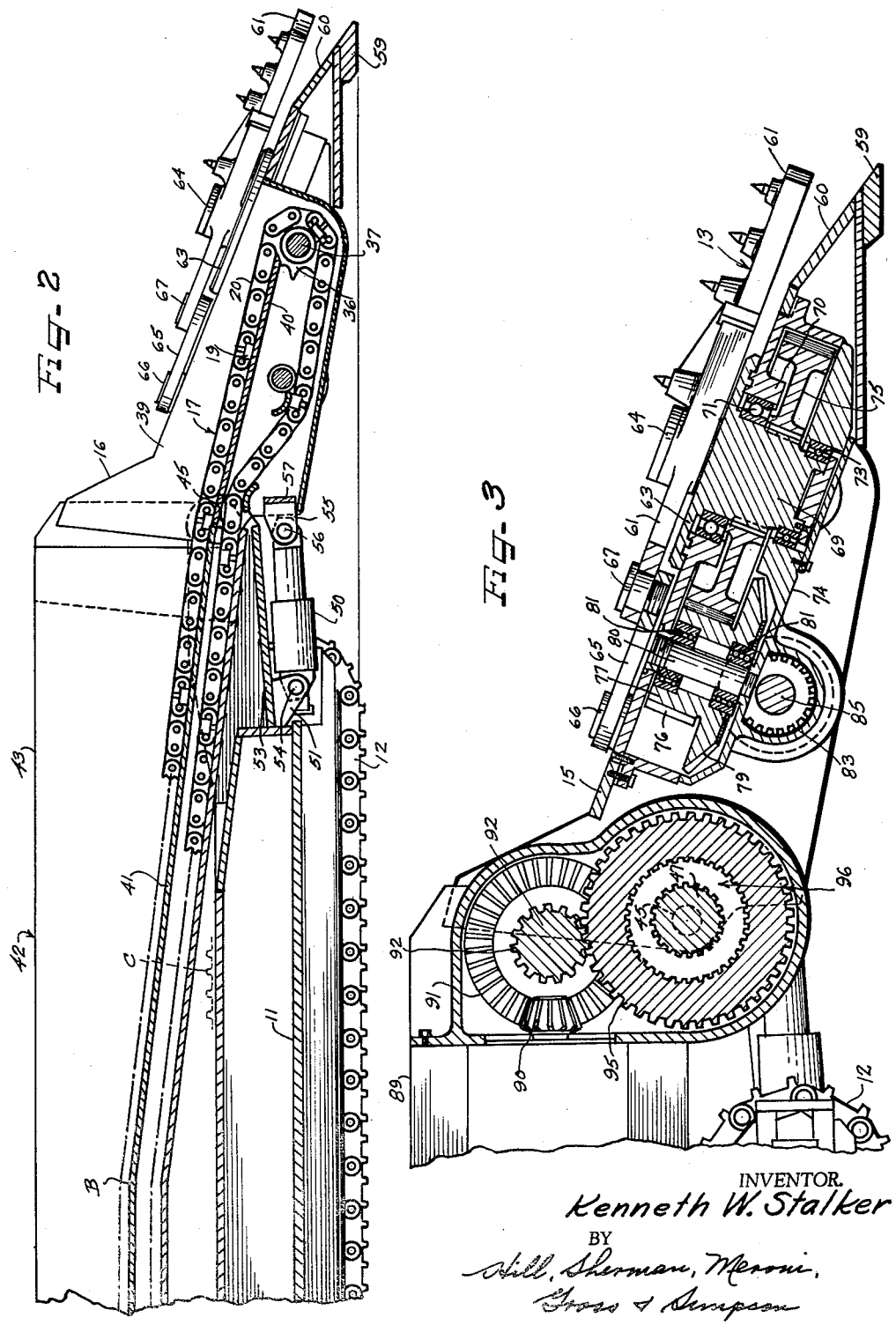

Dec. 8, 1964 K. W. STALKER 3,160,258
LOADING MACHINE
Filed March 28, 1962 3 Sheets-Sheet 3
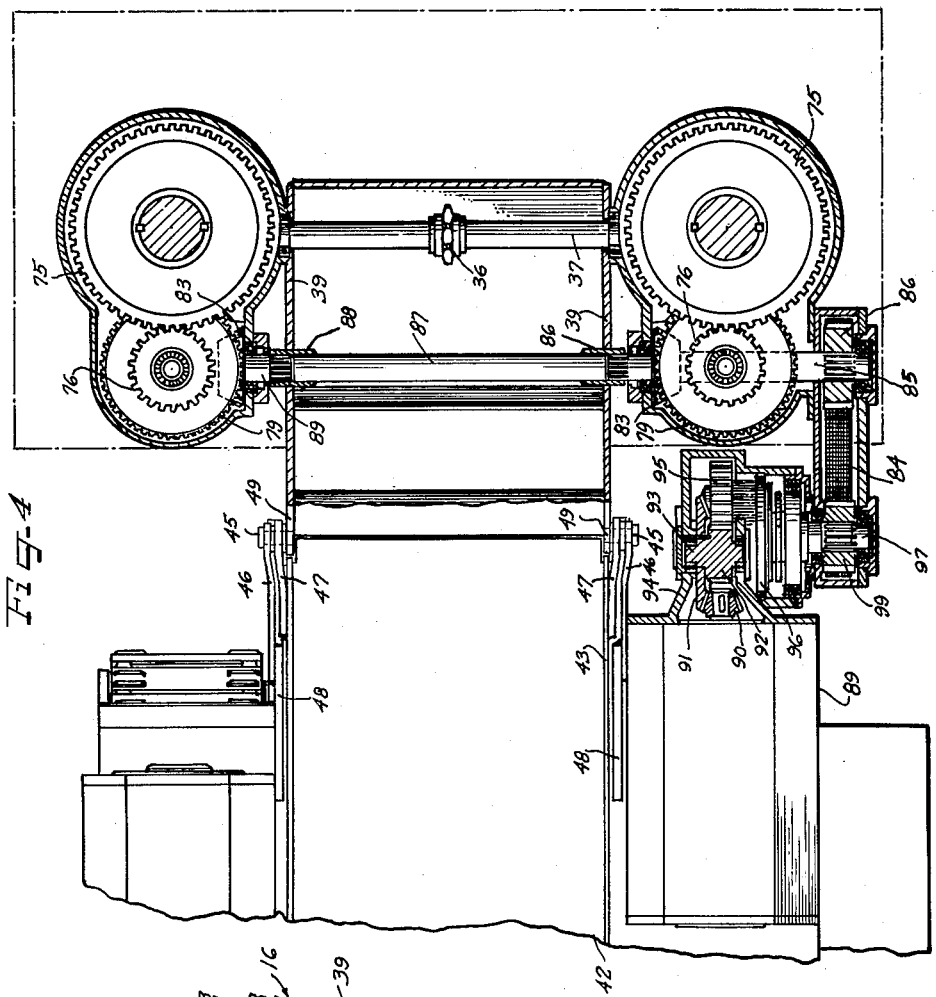
INVENTOR.
Kenneth W. Stalker
BY
Hill, Sherman, Meroni,
Gross & Simpson 3,160,258
LOADING MACHINE
Kenneth W. Stalker, Western Springs, Ill., assignor to Goodman Manufacturing Company, Chicago, Ill., a corporation of Illinois
Filed Mar. 28, 1962, Ser. No. 183,292
3 Claims. (Cl. 198—9)

This invention relates to improvements in loading machines and more particularly relates to such machines operable to pick up and load material in places of low head room.

A principal object of the invention is to provide an improved form of high capacity loading machine of a shorter overall length than formerly, and so arranged as to increase the speed of loading by reducing the tendency of the machine to jackknife about the transverse pivot of the gathering section of the conveyor, as the machine is advanced into the material being loaded.

A further object of the invention is to provide an improved form of loading machine in which the plowing effect formerly present in such machines, as the machine is advanced into the loose material to be loaded, is reduced and the shoveling effect is increased by decreasing the angle of slope of the elevating conveyor of the machine and starting the angle of slope near the rear portion of the main frame of the machine.

Still another object of the invention is to improve upon the loading machines heretofore is used by decreasing the angle of slope of the elevating conveyor of the machine and reducing the overhang of the elevating conveyor at the front of the machine and by driving the gathering devices from a single motor mounted on the main frame of the machine adjacent the front thereof.

A still further object of the invention is to provide an improved form of single motor drive for the gathering devices of a loading machine, dividing the power between the gathering devices closely adjacent the gathering devices, and driving the power divider from the single motor through an overload clutch.

These and other objects of the invention will appear from time to time as the following specification proceeds and with reference to the accompanying drawings wherein:

FIGURE 1 is a top plan view of a loading machine constructed in accordance with the invention;

FIGURE 2 is a fragmentary longitudinal sectional view of the forward end portion of the machine shown in FIGURE 1, taken substantially along lines 2—2 of FIGURE 1;

FIGURE 3 is an enlarged fragmentary sectional view taken through the gathering portion of the machine shown in FIGURE 1 looking substantially along lines 3—3 of FIGURE 1;

FIGURE 4 is a plan view of the forward end portion of the machine with certain parts broken away and certain other parts shown in generally horizontal section in order to illustrate the drive to the gathering devices; and FIGURE 5 is a fragmentary vertical longitudinal sectional view taken through the drive to the gathering devices.

In the embodiment of the invention illustrated in the drawings, I have shown in FIGURE 1 a loading machine 10 including a main frame 11 mounted on laterally spaced continuous traction tread devices 12, propelling the machine from working place to working place and feeding gathering devices 13 into the material to be gathered.

The gathering devices 13 are mounted on an inclined apron 15 extending across the forward end of and rearwardly along opposite sides of a vertically adjustable inclined elevating gathering section 16 of a conveyor 17, extending along the main frame 11 from a position close to the ground in advance of the forward end of said main frame and rearwardly beyond the rear end of said main frame. The conveyor 17 is shown in FIGURE 1 as being conventional laterally flexible single strand chain and flight conveyor including a plurality of longitudinally spaced flights 19 connected to strands of chain 20. The chain 20 and flight conveyor turns about a drive sprocket 21 at the discharge end portion of a laterally flexible portion 22 of the conveyor. The sprocket 21 is mounted on a transverse shaft 23 driven from a motor 24 mounted on a side wall 25 of the laterally flexible portion 22 of the conveyor. The drive from the motor 24 to the shaft 23 and the sprocket 21 may be a conventional drive commonly used to drive the conveyors of loading machines, and is no part of the present invention so need not herein be shown or described further.

The usual hydraulic jack 26 is provided to swing the laterally flexible portion 22 of the conveyor to one side or the other of the centerline of the machine. The hydraulic jack 26 is connected with the main frame of the machine on a vertical pivot pin 27 and with the flexible portion of the conveyor on a pivot pin 30.

The continuous traction tread devices 12 are driven from a motor 31 extending along one side of the main frame of the machine. The motor 31 drives a speed reducer (not shown) contained within a housing 32. The gearing contained within the housing 32 serves as a drive means for suitable reduction gearing and clutch means (not shown) contained within a housing 33 extending rearwardly of the housing 32 and also serves as a drive means for a transverse shaft 34 driving suitable gearing and clutch means (not shown) contained within a housing 35, on the opposite side of the main frame of the machine from the housing 33. The gearing and clutch means contained within the housings 33 and 35 may be of conventional forms and provide independent or simultaneous drives to the two continuous traction tread devices 12, so need not herein be shown or described further. The continuous traction tread devices are driven by rear drive sprockets (not shown) coaxial with centerline A and suitably journalled on the main frame 11.

The conveyor chain 20 and flights 19 turn about an idler sprocket 36 at the forward end portion of the vertically adjustable gathering section 16 of the conveyor. The idler sprocket 36 is mounted on a transverse shaft 37, suitably journalled at its opposite ends in parallel spaced upright side walls 39 of said vertically adjustable gathering section 16 of the conveyor.

The vertically adjustable gathering section 16 of the conveyor includes a bottom plate 40 extending between the side walls 39 and inclined at substantially the inclination of a bottom plate 41 extending between side walls 43 of a stationary section 42 of the conveyor 17, extending along the main frame 11.

It should here be noted that the bottom plate 41 is inclined downwardly at a relatively flat angle from a transverse centerline B spaced rearwardly along the main frame and shown in FIGURE 1 as being adjacent centerline A and just forwardly of the transverse shaft 34. The angle of inclination of the bottom plate 41 flattens out as said bottom plate extends rearwardly from line B and terminates at a bottom plate 44 of the laterally flexible portion of the conveyor in a generally horizontal plane.

The inclined elevating portion of the conveyor is shown in FIGURES 1 and 4 as being pivoted to the intermediate or stationary section 42 of the conveyor for vertical angular movement with respect to the ground on transverse pivot pins 45.

As shown in FIGURES 1 and 4, the pivot pins 45 are mounted in spaced brackets 46 and 47 extending along the side walls 43 of the intermediate section of the conveyor beyond the forward ends thereof. The inner bracket 47 is shown as being mounted on the outside of an associated side wall 43 while the outer bracket is shown as being mounted on and extending forwardly of a plate 48 extending along and upwardly of the main frame 11. The pivot pins 45 extend inwardly within bosses 49 extending outwardly of the side walls 39 and form pivotal mountings for the vertically adjustable gathering section of the conveyor.

It may be seen from FIGURE 2 that the axes of the pivot pins 45 are beneath the plate 40 and are spaced a substantial distance beneath the portion of the conveyor extending rearwardly of line B, are slightly beneath the top run of the continuous traction tread devices 12 as indicated by reference character C, and that this is made possible by starting the slope of the conveyor adjacent the rear end portion of the main frame 11 at a relatively flat angle with respect to the ground instead of starting the slope of the conveyor at the forward end portion of the main frame, as is conventional, and that this gradual slope of the conveyor starting from the rear of the main frame makes it possible to provide a shorter gathering section than has heretofore been possible.

The means for elevating the inclined gathering section of the conveyor about the axes of the coaxial pivot pins 45 is shown in FIGURE 2 as comprising a hydraulic jack 50 pivotally connected at one end between ears 51 depending from a plate 53 extending across the forward end portion of the main frame 11. A transverse pivot pin 54 pivotally connects said jack to said ears. The opposite end of the hydraulic jack 50 is pivotally connected between ears 55 on a transverse pivot pin 56. The ears 55 extend rearwardly of a cross bar 57 extending across the rearward end portion of the inclined elevating section of the conveyor beneath the bottom plate 53. The hydraulic jack 50 may be supplied with fluid under pressure under the control of the usual valves (not shown) operable to supply pressure to said hydraulic jack to raise or lower the gathering section 16 of the conveyor and to hold said section in an elevated or lowered position, and also to release fluid under pressure from the hydraulic jack 50 to accommodate the gathering section 16 to floatingly engage the ground on a shoe 59 extending across and beneath a relatively short steeply inclined section 60 of the apron 15, inclined at a steeper angle than the angle of inclination of the bulk of said apron and forming a wedging surface forced under the loose material by the continuous traction devices 12 and wedging the loose material to be gathered by the gathering devices 13, as said gathering devices are crowded into the material by operation of the continuous traction tread devices 12.

The gathering devices 13 are shown as being conventional forms of orbitally travelling gathering devices in which gathering arms 61 are pivotally mounted intermediate their ends on rotating disks 63 on pivot pins 64, and in which orbital travel of the individual gathering arms 61 is controlled by a link 65 pivoted to the apron 15 at one end on a pivot pin 66 and pivotally connected to the arm 61 by a pivot pin 67.

Each disk 63, as shown in FIGURE 3, has a depending shaft portion 69 journalled in a hub portion 70 of the apron 15 on an anti-friction bearing 71, and journalled at its lower end on an anti-friction bearing 73 mounted in a gear housing 74 disposed beneath the apron 15 and forming a housing for the drive gearing for the disk 63. The shaft 69 has a spur gear 75 keyed or otherwise secured thereto, meshing with and driven from a spur pinion 76, shown in FIGURE 3 as being formed integrally with a hub 77 of a bevel gear 79. The bevel gear 79 is journalled beneath the apron 15 on a shaft 80 on spaced anti-friction bearings 81. The shaft 80 is mounted at one end in the apron 15 and at its opposite end in the gear housing 74 and extends perpendicularly to said apron. The bevel gears 79 are meshed with and driven from bevel pinions 83 journalled in the gear housing 74 and disposed beneath the bevel gears 79. The bevel pinion 83 on the right hand side of the machine is driven from a transverse shaft 85 having a sprocket 86 keyed or otherwise secured to its outer end and meshing with and driven from an endless chain 84. The bevel pinions 83 are connected together by a coupling sleeve 86 splined or otherwise connected to the inner end of the shaft 85. The coupling sleeve 86 is suitably mounted on the right hand end of the transverse shaft 87. A coupling sleeve 88 is secured to the left hand end of the shaft 87 and is splined or otherwise drivingly connected with a stub shaft 89 forming a support and drive member for the left hand bevel pinion 83. The bevel pinions 83 and the shafts 85 and 87 thus form power dividers dividing the power delivered by a motor 89, closely adjacent said gathering devices.

The motor 89 is mounted at the front and the opposite side of the conveyor 17 from the motor 31 and has a bevel motor pinion 90 meshing with and driving a bevel gear 91 secured to a spur pinion 92, shown as being formed integrally with a shaft 93. The shaft 93 extends from opposite sides of the spur pinion 92 and is suitably journalled at its opposite ends in a housing 94, shown as extending forwardly of and as being formed integrally with a front end cover for the motor 89. The spur pinion 92 meshes with a spur gear 95 forming the drive member for a friction slip clutch 96. The friction slip clutch may be a well known form of torque type of friction disk clutch suitably loaded to slip upon predetermined overload conditions of the gathering arms 61. The friction clutch 96 is mounted coaxially of a transverse shaft 97 coaxial with the pivot pins 45 forming a pivot for the gathering section 16 of the conveyor. A sprocket 99 driven from the clutch 96 meshes with the endless chain 84 for driving said chain and the transverse shaft 85.

With the gear train just described, a single motor mounted on the main frame 11, forms a drive means for the gathering arms 61 on each side of the inclined gathering section 16 of the conveyor 17, in which the gathering devices are directly driven by spur gears beneath the apron 15 and the load between the spur gear drive trains for driving the gathering arms 61 is divided at the drive to the spur gear drive trains, in advance of the overload friction disk clutch 96, taking the loads developed by the two gathering arms.

It may also be seen that by elongating the slope of the elevating conveyor 17 to extend along the main frame 11 from a position adjacent the rear end portion of said main frame, the length and slope of the vertically adjustable gathering section of the conveyor may be substantially reduced from the length and slope of the gathering section of the conveyor of the conventional loading machine and thereby reducing the angle of the apron and the tendency of said apron to plow the loose material as it is advanced by the traction devices 12, and that in the present machine the pivot of the vertically adjustable gathering section of the conveyor is closer to the ground than former pivots, with the result that the loads of crowding and gathering are close to and in many cases above the pivot for the adjustable elevating section of the conveyor with a resultant reduction in the tendency for the machine to buckle about the pivot.

While I have herein shown and described one form in which my invention may be embodied, it may readily be understood that various variations and modifications in the invention may be attained without departing from the spirit and scope of the novel concepts thereof as defined by the claims appended hereto.

I claim as my invention:

1. In a loading machine of the class described,
a main frame,
traction devices for supporting said main frame for movement along the ground, an elevating conveyor extending along said main frame and beyond the rear end thereof and having a generally horizontal rear section and a declined forward section extending from said rear section from a position intermediate the front and rear ends of said traction devices and having an angularly adjustable gathering section forming a forward continuation of said declined forward section and extending at the angle of said declined forward section when the machine is on level ground, at least one transverse pivot shaft pivotally mounting said gathering section to said declined forward section and disposed a substantial distance beneath said horizontal rear section and a substantial distance forwardly of the connection between sid horizontal rear section and the forwardly declined forward section, an inclined apron extending across the forward end of said gathering section into position to engage the ground and rearwardly along opposite sides of said gathering section and having gathering devices on each side thereof for progressing the mined material onto said gathering section, a single motor mounted at the forward end of said main frame on one side of said conveyor, drive connections from said motor to said gathering devices including meshing spur gears journalled beneath said apron for rotation about axes perpendicular to the plane of said apron, a power divider for driving said spur gears, and a driving connection from said motor to said power divider including a shaft coaxial with said transverse pivot shaft and driven by said motor.

2. In a loading machine, a main frame, a conveyor extending along said main frame, continuous traction tread devices supporting said main frame, a motor on one side of said main frame, a drive connection from said motor to said traction devices including a transverse shaft extending across said main frame beneath said conveyor, said conveyor having a horizontal rear section and a forwardly declined forward section declined toward the ground from a position adjacent the rearward end portions of said traction devices and having a gathering section extending in advance of said main frame to the ground and transversely pivoted to said forward section for adjustable movement up and down from a position of substantial alignment with said forward section, said gathering section having an inclined apron extending across the forward end thereof and rearwardly along opposite sides thereof and terminating in a plane a substantial distance above said transverse axis, gathering devices mounted on each side of said apron, a second motor at the opposite side of said main frame from said first mentioned motor, drive connections from said motor to said gathering devices including meshing spur gears rotatable about axes generally perpendicular to the plane of said apron, power dividing means driven from said motor and driving said meshing spur gears, an overload clutch coaxial with the transverse pivotal connection of said gathering section to said declined forward section and driven by said motor, and a chain and sprocket drive connection between said overload clutch and said power divider.

3. In a loading machine of the class described, a main frame, traction devices for supporting said main frame for movement along the ground, a traction device drive motor on one side of said main frame, an elevating conveyor extending along said main frame and having a generally horizontal rear section and a declined forward section extending from said rear section from a position intermediate the ends of said traction devices, and having an angularly adjustable gathering section forming a forward continuation of said declined forward section and adjustable up and down from the plane of said declined forward section, at least one transverse pivot shaft pivotally mounting said gathering section to said declined forward section and disposed a substantial distance beneath the plane of said horizontal rear section and a substantial distance forwardly of the connection between said horizontal rear section and said declined forward section, an inclined apron extending across the forward end of said gathering section into position to engage the ground and rearwardly along opposite sides of said gathering section and having gathering devices on each side thereof, for progressing the mined material onto said gathering section, a single gathering device drive motor mounted on said main frame adjacent the forward end thereof at the opposite side of said main frame from said traction device drive motor, drive connections from said gathering device drive motor to said gathering devices including meshing spur gear journalled beneath said apron for rotation about axes perpendicular to the plane of said apron, a power divider for driving said spur gears, and a drive connection from said motor to said power divider including a shaft coaxial with said transverse pivot shaft, a geared drive connection from said motor to said coaxial shaft including an overload clutch coaxial with said coaxial shaft, a bevel geared drive connection driving said power divider and one of said meshing spur gears, and a chain and sprocket drive connected from said shaft coaxial with said transverse pivot shaft and driven by said clutch and having driving connection with said bevel geared drive connection.

References Cited in the file of this patent
UNITED STATES PATENTS

| | | |
|---|---|---|
| 2,360,282 | Russell | Oct. 10, 1944 |
| 2,793,732 | Russell | May 28, 1957 |